United States Patent
Marrucci (10) Patent No.: US 8,264,623 B2
(45) Date of Patent: Sep. 11, 2012

(54) LIQUID CRYSTAL GEOMETRICAL PHASE OPTICAL ELEMENTS AND A SYSTEM FOR GENERATING AND RAPIDLY SWITCHING HELICAL MODES OF AN ELECTROMAGNETIC WAVE, BASED ON THESE OPTICAL ELEMENTS

(75) Inventor: Lorenzo Marrucci, Naples (IT)

(73) Assignee: Consiglio Nazionale Delle Ricerche—INFM Instituo Nazionale per la Fisica Della Materia, Genoa (IT)

( * ) Notice: Subject to any disclaimer, the term of this patent is extended or adjusted under 35 U.S.C. 154(b) by 974 days.

(21) Appl. No.: 12/259,256

(22) Filed: Oct. 27, 2008

(65) Prior Publication Data
US 2009/0141216 A1 Jun. 4, 2009

(30) Foreign Application Priority Data

Apr. 26, 2006 (IT) .............................. TO2006A0303
Apr. 20, 2007 (WO) .................. PCT/IB2007/051441

(51) Int. Cl.
*G02F 1/1335* (2006.01)
(52) U.S. Cl. ........................................................ 349/12
(58) Field of Classification Search ...................... 349/18
See application file for complete search history.

(56) References Cited

U.S. PATENT DOCUMENTS
2006/0126183 A1* 6/2006 Hasman .......................... 359/573

FOREIGN PATENT DOCUMENTS
WO WO 2004/003596 A2 1/2004

OTHER PUBLICATIONS

Bomzon et al., "Pancharatnam-Berry phase in space-variant polarization-state manipulations with subwavelength gratings," *Optics Letters* 26:1424-1426 (2001).
Marrucci et al. "Pancharatnam-Berry phase optical elements for wave front shaping in the visible domain: Switchable helical mode generation," *Applied Physics Letters* 88:221102-1-221102-3 (2006).

* cited by examiner

*Primary Examiner* — Phu Vu
(74) *Attorney, Agent, or Firm* — Kilpatrick Townsend & Stockton LLP (57) ABSTRACT

Geometrical phase optical elements comprising, as a birefringent means, a liquid crystal material with a spatially inhomogeneous orientation of the molecular director in a plane orthogonal to the direction of propagation of an input radiation beam, ordered according to a predetermined geometrical pattern. Also, an optical system for generating helical modes of propagation of an optical radiation beam, including a geometrical phase optical element orientated transversely to the direction of propagation of the beam, whose optical axis is orientated according to a predetermined geometrical relation adapted to transform a circular polarized input radiation beam into a helical mode with a wavefront having a helical surface whose handedness is a function of the handedness of the input polarization, in which the switching between different orders of helicity of the radiation beam emerging from the geometrical phase optical element is carried out by switching the circular polarization state of the input radiation.

17 Claims, 4 Drawing Sheets

LIQUID CRYSTAL GEOMETRICAL PHASE OPTICAL ELEMENTS AND A SYSTEM FOR GENERATING AND RAPIDLY SWITCHING HELICAL MODES OF AN ELECTROMAGNETIC WAVE, BASED ON THESE OPTICAL ELEMENTS

CROSS-REFERENCES TO RELATED APPLICATIONS

This application claims priority to International Patent Application No. PCT/IB2007/051441, filed Apr. 20, 2007 and priority to Italian application TO2006A000303 filed Apr. 26, 2006, the full disclosures of which are incorporated herein by reference.

BACKGROUND OF THE INVENTION

The present invention relates to optical components for shaping the wavefront of a beam of electromagnetic radiation, and to their use in the field of optical communications for information encoding, particularly for optical communications in the visible or near infrared spectrum.

More specifically, the invention relates to the production of geometrical phase optical components and the use of these optical components for generating helical modes of an optical electromagnetic wave.

Optical components for wavefront shaping are normally based on a suitable spatial modulation of the length of the optical path travelled by different portions of the wavefront, such as that provided by passive components such as lenses, curved mirrors and gradient-index (GRIN) components, and also by active components such as spatial light modulators (SLM) of the liquid crystal or other types.

A different and highly versatile approach, in which phase modulation is introduced by diffraction, makes use of holographic components. However, holographic components normally have the drawback of simultaneously generating a plurality of diffraction orders with different wavefronts in addition to the desired wavefront.

There is an approach to the spatial modulation of the optical phase which is completely different from the preceding ones, and which is based on what is known as the "geometric phase" or Pancharatnam-Berry phase.

This relates to a phase delay (additional to that due to the length of the optical path) which an electromagnetic wave acquires when its polarization is subjected to a series of transformations whose initial and final states are identical. This phase is determined solely by the geometry of the closed path travelled in the light polarization space (such as the Poincare sphere). If the polarization of a wave is subjected to transformations which differ from point to point along the transverse profile of the wave, but which start and terminate with a spatially homogeneous polarization state, the wave acquires a clearly defined geometrical phase which differs from one point of its transverse profile to another, and the wavefront is consequently modified.

It has recently been proposed that this effect should be used to produce "geometrical phase" or "Pancharatnam-Berry" optical components ("Pancharatnam-Berry Optical Elements", PBOE) for modulating the wavefront.

The only PBOE's produced up to the present are based on optical gratings with a pitch smaller than the wavelength (known as "subwavelength gratings"), which limits their application to the mid-infrared domain, using the fabrication methods available today. The specific components which have been produced include beam-splitters, helical mode generators, lenses, all operating at wavelengths in the vicinity of 10 μm.

WO2004/003596 describes such components for the spatial control of the phase of an incident electromagnetic beam as a function of its polarization. The element comprises a substrate with a plurality of grating regions having a pitch smaller than the input wavelength, and having a continuously variable spatial orientation.

However, the visible and near infrared domain is the one which is most useful for applications in the telecommunications field, and it would be desirable to produce PBOE's operating in this wavelength range (approximately from 400 nm to 1700 nm).

A specific type of PBOE which is of particular interest for its potential applications in this optical frequency domain is that of generators of helical modes (such as the Laguerre-Gauss modes).

These particular modes of the electromagnetic field are used at present for the controlled manipulation of micrometric particles in so-called optical tweezers.

The helical state (referred to as "helicity" hereafter for the sake of brevity) of light is considered to be interesting as a possible discrete variable with a plurality of values for encoding information in optical communication in the air or in optical fibres, and for communication protected by quantum cryptography.

The methods conventionally used to generate helical beams in the visible or near infrared domain can be divided into the following three categories:
  (i) the cylindrical lens method;
  (ii) the spiral plate method;
  (iii) holographic methods.

Method (i) is based on the transformation of Hermite-Gauss modes to Laguerre-Gauss modes by passage through two suitably positioned cylindrical lenses. The switching of the helicity state requires the movement of the lenses or switching between different Hermite-Gauss modes, neither of which processes can be automated easily or quickly.

Method (ii) is based on the production of a plate of isotropic glass, machined so as to have a surface in the form of a single helical pitch (like a spiral staircase), which is concluded by a step of suitable thickness, such that it induces a phase delay in the light passing through the plate equal to an exact multiple of $2\pi$. Fine adjustment of the phase delay can be achieved by immersing the plate in a liquid and adjusting the temperature so as to modify the refractive indices of the plate and the liquid. This method does not allow any switching and provides a helical beam with a substantially locked helicity.

Finally, in holographic methods (iii) the beam is diffracted into a hologram suitably designed to produce the desired helical beams in the diffracted orders. It is also possible to obtain different beams simultaneously with different helicities, but travelling in different directions. If it is desired to switch the helicity of a single beam, it is necessary to modify the hologram (which can be done by using holograms generated in a computer-controlled spatial phase modulator, although this does not allow switching rates faster than a few hundreds of hertz), or to modify the direction from which the incident beam arrives. Fast switching can therefore be achieved only by switching the incoming beam between a plurality of beams arriving from different directions, giving rise to obvious problems of complexity and wastage of optical energy. Furthermore, the generation efficiency of holographic methods is no greater than 70%; in other words, they waste at least 30% of the light energy of each incident beam.

Thus all of these methods for generating helical modes in the visible or near infrared domain have the same limitation: they do not allow fast switching of the state of helicity or "order" of the helical mode.

This limitation is particularly serious where possible communications applications are concerned.

The alternative use of PBOE's produced according to the prior art is, as has been said, confined to applications in the mid-infrared domain, and is therefore excluded at present from optical communications applications at the useful wavelengths.

The object of the present invention is to provide a satisfactory solution to the problems described above, i.e. to produce geometrical phase optical elements operating in the visible and near infrared spectral domain.

A further object of the invention is to provide a helical mode generation system, based on geometrical phase optical elements, which allows fast switching of the helicity state of the helical mode, while avoiding the drawbacks of the known art.

According to the present invention, these objects are achieved by means of a geometrical phase optical element having the characteristics claimed in claim 1 and a system having the characteristics claimed in claim 14.

BRIEF SUMMARY OF THE INVENTION

Briefly, the present invention is based on the general principle of producing "geometrical phase" optical components, or "Pancharatnam-Berry optical elements," for wavefront shaping (for example, lenses, beam splitters, holographic components), operating in the visible and near infrared domain and using as a birefringent means a liquid crystal whose optical axis—corresponding to the molecular director—can be controlled easily, for example by the application of external fields or surface treatments.

The method is based on liquid crystal technology, and more specifically on the production of liquid crystal cells with suitably patterned inhomogeneous planar anchorage, or polymeric liquid crystal films with suitably patterned inhomogeneous molecular alignment.

These devices can be produced by various existing technologies, including in particular, a "polarization" holographic method, which can record any waveform on the optical component, and which will subsequently be able to reconstruct the same wavefront, with the advantage over normal holographic components of not generating contributions of "zero order" or of orders opposed to the desired one.

Conveniently, for certain specific applications, PBOE's can have various advantages over normal optical components, including, in particular, a uniform and very small thickness, and switchability of the wavefront generated on the basis of the input polarization.

One type of geometrical phase optical component whose use is desirable for encoding information in optical communication in the visible and near infrared domain is the helical mode generator.

In order to control the generation of helical modes and the fast switching of the helicity state of the helical mode, it is also disclosed a system for the fast switching of an optical wavefront emerging from a geometrical phase optical component, by electro-optical modulation of the polarization of the wave incident on the component, using the geometric phase optical components' property of creating an effect on the wave passing through them, which depends on the polarization of the incident light.

A practical demonstration of the proposed system is provided by the production of a specific geometrical phase optical component which can generate helical modes of light from a normal Gaussian optical beam.

Unlike the systems commonly used for helical mode generation in the visible or near infrared domain, the system proposed by the invention makes it possible to control the helicity of the wavefront of the generated light (in other words, whether the helix is right-handed or left-handed) by using the polarization state of the incident light, instead of by using the geometry of the apparatus, thus permitting fast switching which is impossible with the known methods.

A description is also given of the innovative layout of an optical system based on a set of optical components similar to that which is disclosed, for helical mode generation with electro-optical switching among a plurality of different helicity states.

The system proposed by the invention is simple and efficient in terms of energy conversion and can be applied advantageously in the transmission of conventional or quantum information, encoded in the helicity state of the phase profile of light.

Other features and advantages of the invention will be revealed more fully in the following detailed description which is given by way of non-limiting example with reference to the appended drawings, in which:

DETAILED DESCRIPTION OF THE INVENTION

The description of the invention is based on a specific class of geometrical phase optical components, composed of half-wave birefringent means whose optical axis is spatially inhomogeneous in a plane orthogonal to the propagation direction of an incident optical beam, in an embodiment shaped as plates whose optical axis is spatially inhomogeneous in the plane of the plate (referred to below as "half-wave PBOE's").

We will consider a plane birefringent plate orientated perpendicularly to the direction z of propagation of the light. It is assumed that the plate causes a phase shift of $\pi$ (half wave) between the extraordinary and ordinary components of the light, in a homogeneous way throughout the plate, and that the optical axis (for example the "fast" axis) of the plate is inhomogeneous in the transverse plane xy (but homogenous in the direction z). Let $\alpha(x,y)$ be the angle formed by the optical axis of the plate with the reference axis x in the plane xy.

If we disregard the diffraction effects within the plate itself, the effect of this plate on the electrical field of the wave can be determined by the Jones formalism.

The Jones matrix $M(x,y)$ of the plate at each point x, y of the transverse plane is as follows:

$$M = R(-\alpha)\begin{pmatrix} 1 & 0 \\ 0 & -1 \end{pmatrix} R(\alpha) = \begin{pmatrix} \cos 2\alpha & \sin 2\alpha \\ \sin 2\alpha & -\cos 2\alpha \end{pmatrix}$$

where $R(\alpha)$ is the two-dimensional rotation matrix at an angle $\alpha$.

An input left-circular polarized plane wave, described by the Jones (electric-field) vector $$E_{in} = E_0 \begin{bmatrix} 1 \\ i \end{bmatrix}$$

will be transformed by the plate into the following output wave (except for a constant phase which is irrelevant for our purposes):

$$E_{out} = M \cdot E_{in} = E_0 e^{i2\alpha(x,y)} \begin{bmatrix} 1 \\ -i \end{bmatrix}$$

This wave is uniformly right-circular polarized, but its wavefront has acquired a nonuniform phase delay $\Delta\Phi(x, y)$ equal to $2\alpha(x, y)$.

If the input wave is right-circular polarized, it is easy to verify that the generated wavefront is the conjugate one, i.e., $\Delta\Phi(x, y)=-2\alpha(x, y)$.

The output beam therefore has a wavefront shaped by the geometry of the PBOE, and particularly of the function $\alpha(x, y)$ which describes the inhomogeneous orientation of the optical axis, with the additional possibility of switching between two conjugate wavefronts by inverting the input circular polarization handedness.

This is the basic principle of operation of "half-wave" PBOE optical components on which the present invention is based.

A PBOE optical component which can be used in the visible or near infrared domain can advantageously be fabricated by a liquid crystal technology, as demonstrated below.

This is because liquid crystals are transparent and birefringent materials whose optical axis (corresponding to the so-called "molecular director") can easily be controlled, for example, by surface treatments or applied external fields, or—in the case of polymer liquid crystal material—determined during preparation by specific photopolymerization procedures.

It is relatively easy to produce structures in which the optical axis takes on a predetermined inhomogeneous orientation, so that the desired geometry $\alpha(x,y)$ can be created.

In particular, two general systems for fabricating liquid crystal PBOE components are described. The first is appropriate for the case in which monomeric liquid crystals are used, while the second is specific to liquid crystal polymers.

In a first method, shown schematically in its different steps in FIG. 1, a first substrate 20 (typically a glass, coated if necessary with a polymer or polyimide layer for planar anchorage of the liquid crystal) is prepared, with a surface 22 for "planar anchorage" which is suitably "patterned," in other words which has an "easy axis" orientated according to the geometry determined by the function $\alpha(x,y)$.

In the known art there are various surface patterning methods which can be used:
(i) micro-rubbing;
(ii) photo-alignment of polymers which have previously been deposited on the surfaces using masks or by polarization holography;
(iii) suitable silicon oxide coatings produced by evaporation.

A second substrate 24 is then prepared, with a surface 26 treated to provide a "degenerate" planar anchorage (in other words one which does not impose any preferred orientation on the molecular director) with a low anchoring force, or alternatively "patterned" in mirror mode, in other words such that the easy axes of the two surfaces 20 and 24 coincide everywhere if the substrates are made to contact each other on the side of the treated surfaces 22 and 26 (step (a)).

The two substrates 20 and 24 are then assembled, with the two treated surfaces 22 and 26 facing inwards, with the insertion of suitable spacers 28 (step (b)) so as to form a planar empty cell 30 open at the sides (step (c)).

A liquid crystal material 32 is inserted into the cell and the open outer sides can finally be sealed if necessary, for example with an adhesive 34 (step (d)).

After the insertion of the liquid crystal, which is assumed to be in nematic phase in this case, it may be necessary to carry out a "clearing" heat treatment (in other words, raising the temperature above the nematic-isotropic transition point) to achieve the desired alignment of the molecular director. Additionally, if one of the two substrates of the cell is of the degenerate anchorage type, it may be convenient to maintain the temperature of this substrate at a level slightly higher than that of the "patterned" substrate during the cooling step after clearing. Thus, the nematic order is nucleated from the patterned substrate according to the predetermined alignment and is then propagated through the whole cell.

The thickness of the cell (defined by the spacers) and the liquid crystal material used must be chosen so as to impose a birefringent delay of $\pi$ at the operating wavelength.

A second alternative method of producing PBOE's for operation in the visible domain is based on the preparation of liquid crystal polymer films with patterned molecular alignment.

There are currently various possible approaches to the preparation of polymers with anisotropic molecular organization, and therefore birefringent, and with inhomogeneous optical axes following a predetermined "pattern". The most important methods are based on photopolymerization or photoalignment in polarized light, which cause the formation of polymer chains (main or side chains) orientated according to the incident light polarization (parallel or perpendicular to the electrical field of the light).

To create the desired pattern, it is possible to carry out a series of successive radiation processes which illuminate different regions of the polymer at different times, specifying for each region the polarization required to achieve the predetermined orientation.

An approach which is particularly convenient for fast preparation can be based on the use of "masks," making it possible to illuminate simultaneously all the regions which are to acquire the same orientation, as in photolithography methods.

An alternative approach is based on so-called "polarization holography," which enables the desired orientation to be recorded over the whole polymer in a single exposure. In this approach, the method of writing the desired pattern is based on the combination of a reference laser beam with a plane wavefront and a "signal" laser beam with the wavefront which it is desired to reproduce subsequently, both being circular polarized in opposite directions and with uniform intensity. The superimposition of these two beams generates a wave which has uniform intensity and linear polarization with non-uniform orientation. This orientation is then fixed on the polymer and defines the orientation of the birefringent optical axis of the material. A material prepared in this way is a particular type of hologram, called a "polarization hologram."

To produce the PBOE component, however, it is necessary to operate in such a way that the polymer film has an overall birefringence and thickness such that a delay of $\pi$ is induced. This may require prolonged exposures and the use of materials whose absorption coefficients are not excessive at the wavelength of the light used for "writing" (in other words, such that they have a penetration length comparable with, or greater than, the thickness of the film).

Alternatively, the polymer film patterned in this way can be used as the "patterned" surface of one of the two substrates of a liquid crystal cell prepared as described for the first method.

It should be noted that, unlike a normal holographic component for wavefront shaping, a PBOE (even if produced by a holographic method) has the property of generating only the previously recorded wavefront, or the conjugate wavefront, if illuminated with a circular polarized plane wave. This is advantageous for many applications.

The choice between the two wavefronts is determined by the input circular polarization handedness, permitting the fast switching which is useful for some applications.

We shall now consider in FIG. 2 some examples of "half-wave" PBOE components which can be produced by the described technique, without thereby limiting the general application of the method. The broken lines indicate the local orientation of the birefringent optical axis (which in the case of production in the form of a liquid crystal cell corresponds to the orientation of the easy axis to be "patterned" on the substrate).

Figure 1A:
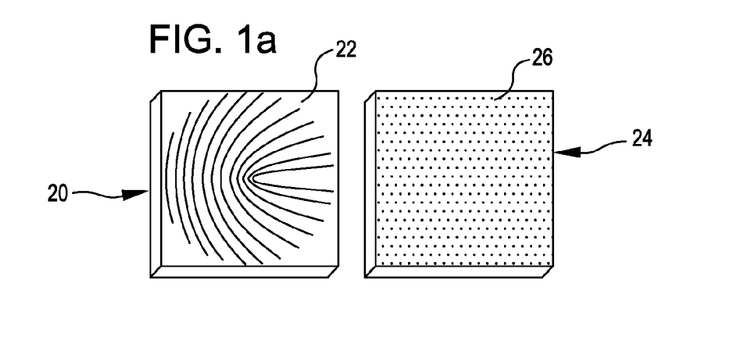
FIG. 1 is a schematic representation of the sequence of steps of production ((a)-(d)) for the preparation of a liquid crystal geometrical phase optical component.
Figure 1B:
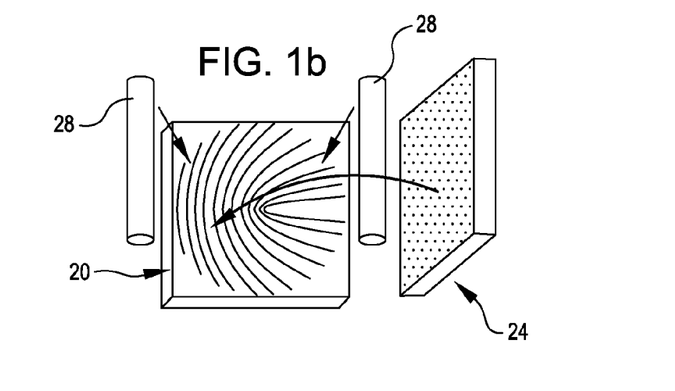
Figure 1C:
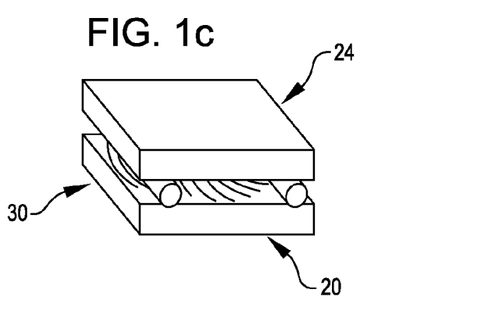
Figure 1D:
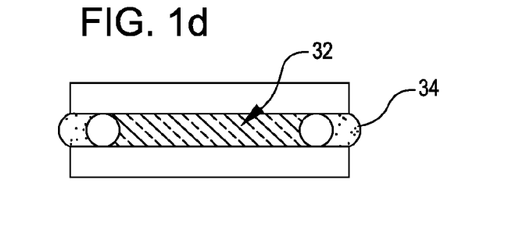
Figure 2A:
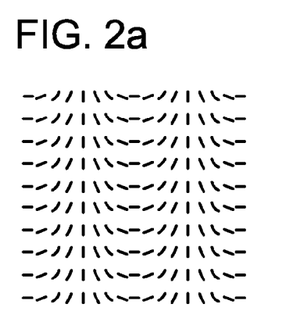
FIG. 2 shows four examples ((a)-(d)) of geometries of "half-wave" geometrical phase optical components.

A first example, shown in FIG. 2(a), is a PBOE with a linear orientation gradient, which can act as a circular polarizing beam splitter which has a linear dependence of the angle $\alpha$ on the position, such as that described by the following relation:

$$\alpha(x, y) = ax + b,$$

where a and b are constants. The effect on a circular polarized input wave is that of introducing a phase shift of $\Delta\Phi \pm 2ax$, with the exception of irrelevant constant phases, with the sign ± determined by the polarization handedness. This phase shift is manifested by a deviation of the propagation direction of the output wave by an angle $\beta = \pm a\lambda/\pi$ in the plane xz, where $\lambda$ is the wavelength (it is assumed that $a\lambda \ll 1$, a hypothesis required in order to disregard diffraction effects within the plate).

In other words, the optical component described operates as a polarizing beam splitter, which separates the left-circular polarized light from the right-circular polarized light (while inverting the polarization at the same time). If this component is combined with an electro-optical device for switching the input polarization between the two circular polarizations (for example, a Pockels cell followed by a quarter-wave plate), an electro-optical switch is obtained.

Figure 2B:
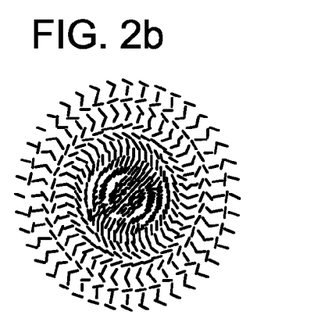

A second example, shown in FIG. 2(b), is a radial gradient PBOE, operating as a lens with focal length dependent on the input polarization, which has the following geometry:

$$\alpha(x, y) = \alpha(r, \phi) = ar^2,$$

where a is a constant, and r, $\Phi$ are polar coordinates in the plane xy. The effect of this component on a circular polarized input wave is to introduce a parabolic phase shift, similar to that produced by a lens with focal length $f = \pm\pi/(2\lambda a)$, where the sign ± depends on the input polarization handedness. When combined with electro-optical polarization control and an ordinary lens, this produces a focusing optical system with a focal length which can be automatically switched between two values.

It is also worth noting that the optical component acting as a lens can advantageously be produced as a plate of uniform thickness, using the geometrical phase effect instead of the optical path length effect.

Phase shifts which may be very large between different portions of the wavefront can be introduced even by very thin plates (even those of the order of 1 μm, provided the birefringence of the material is fairly high).

Figure 2C:
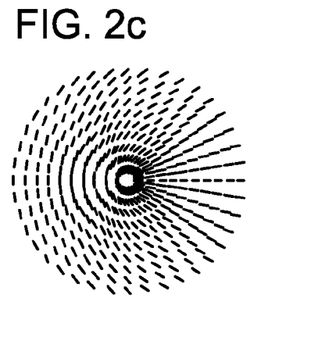
Figure 2D:
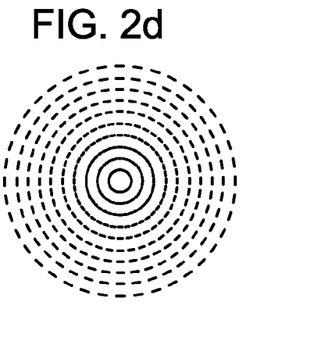

Further examples, shown in FIGS. 2(c) and 2(d), relate to PBOE's operating as helical mode generators, which have a geometry described by the following relation:

$$\alpha(x, y) = \alpha(r, \Phi) = q\Phi + \alpha_0,$$

where r, $\Phi$ are the polar coordinates in the plane xy, and q and $\alpha_0$ are constants. It is also assumed that the value of the constant q is an integer or semi-integer, so as to avoid the presence of discontinuity lines in the plate (however, a defect remains at the origin, where $\alpha$ is undefined).

Components with the aforementioned geometry will subsequently be referred to as q-PBOE's.

Two examples of this geometry, for $q=\frac{1}{2}$, $\alpha_0=0$ and for $q=1$, $\alpha_0=\pi/2$, are shown in FIGS. 2(c) and 2(d) respectively, for the generation of helical modes, respectively, of order ±1 (q-PBOE with $q=\frac{1}{2}$) and order ±2 (q-PBOE with $q=1$).

A circular polarized input plane wave passing through a q-PBOE acquires a phase delay of $\Delta\Phi = \pm 2q\phi$; in other words it is transformed into a helical mode of order $m = \pm 2q$, having a wavefront in the form of a helical surface (particularly a single helix if $|q|=\frac{1}{2}$, a multiple helix if $|q|$ is larger).

In this case also, the sign ±, and therefore the direction of the helix of the generated wavefront, is determined by the input circular polarization handedness.

For the production for demonstration purposes of the PBOE components according to the invention of the type shown in FIGS. 2(c) and 2(d), a number of q-PBOE's (in other words, helical mode generating PBOE's) were produced with liquid crystals with q=1, using a patterning method based on the inhomogeneous rubbing of a surface. In particular, since the case q=1 is symmetrical for rotations about the origin, it was possible to use a particularly simple method for producing the desired pattern: the surface to be treated (bare glass or glass coated with polyimide for planar alignment) was placed in contact for several minutes, with the application of light pressure, with another surface having a velvet covering suitable for rubbing, kept in constant rotation about an axis perpendicular to the two surfaces in contact. This "circular rubbing" produces a pattern of the easy axis similar to that described by the equation $\alpha(x, y) = \alpha(r, \Phi) = q\Phi + \alpha_0$ with q=1 and $\alpha_0 = \pi/2$, in other words similar to that shown in FIG. 2(d).

In the production process, only one substrate was subjected to rubbing, while the other was left untreated so as to have a degenerate planar alignment. The two substrates were then assembled, with the insertion of spacers with a thickness such as to provide, with the liquid crystal used (E63, produced by Merck), the desired birefringence of approximately $\pi$ (or one of its odd multiples) for the test wavelength, namely $\lambda=633$ nm.

The experimental tests which demonstrate that the cells produced actually behave as q-PBOE's with q=1, in other words that they generate helical modes of light of order $\pm 2$ with the sign determined by the input polarization handedness, are discussed below.

Figure 3:
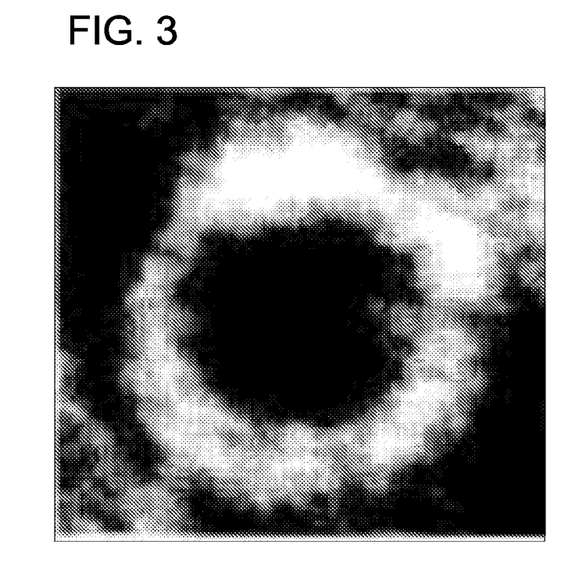
FIG. 3 shows an image of the intensity profile of a light beam emerging from a liquid crystal geometrical phase optical component according to the invention.

As a first step, a Gaussian light beam (in other words one with transverse mode $TEM_{00}$) was sent from a He—Ne laser (emission wavelength $\lambda=633$ nm) through the q-PBOE, and the output beam was sent to a CCD video camera which photographed the intensity profile of the beam. The result is shown in FIG. 3. The output beam is found to have an annular geometry, which is consistent in qualitative terms with the fact that the mode concerned is helical (because helical modes must have zero intensity in the centre, where the wavefront defect is located).

However, in order to completely characterize the helical structure of the generated wavefront and check that the handedness of the helix depends on the input polarization, it is however necessary to carry out interference measurements between the beam emerging from the q-PBOE and a reference beam.

The reference beam, taken from the same He—Ne laser source by means of a beam splitter, can have an approximately plane or spherical wavefront. In the first case, if a small inclination is created between the beam to be analysed and the reference beam, the resulting interference has a system of linear fringes, with a defect of the "dislocation" type which originates in the centre of the helical beam. The defect is orientated in different ways according to the sign of the helicity of the helical beam, without any change in the interference geometry. Additionally, the dislocation is multiple if the helical beam has $|m|>1$, and, in particular, it is double if $m=\pm 2$. In the second case, the interference produces fringes of spiral shape. The spiral has a direction (clockwise or anticlockwise from the centre outwards) which depends on the sign of the helicity of the helical beam. Additionally, the spiral is multiple if the helical beam has $|m|>1$, and, in particular, it is double if $m=\pm 2$.

Figure 4A:
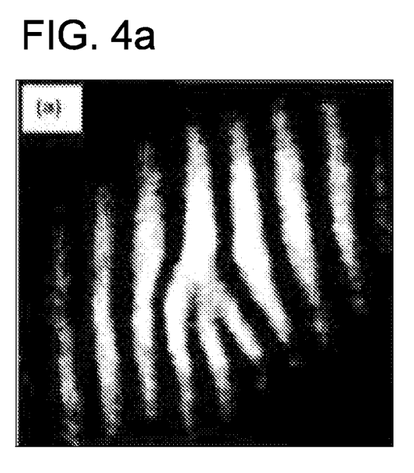
FIGS. 4 and 5 show two pairs of images which represent interference patterns of the helical beam generated by a liquid crystal geometrical phase optical component superimposed on a reference beam with a wavefront which is plane (FIG. 4) or spherical (FIG. 5) respectively, for different polarizations of the incident light.
Figure 4B:
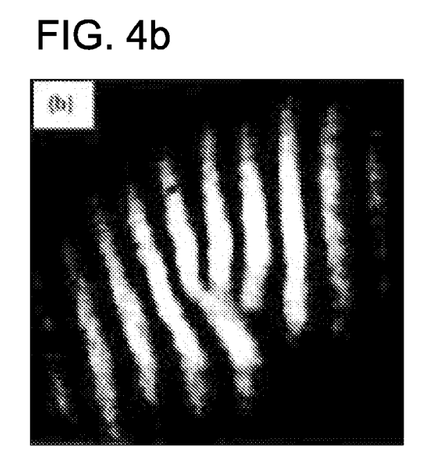
Figure 5A:
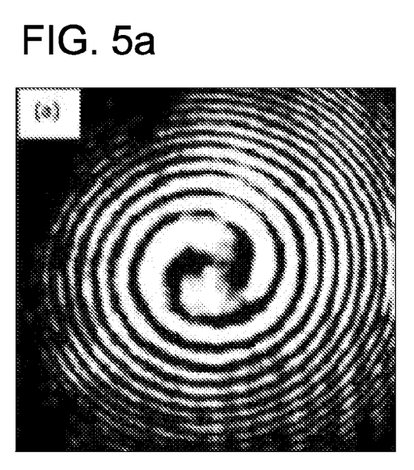
Figure 5B:
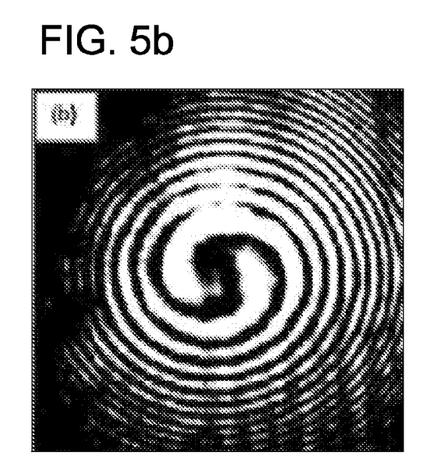

FIGS. 4 and 5 show the photographs (taken with the CCD video camera) of these interference patterns produced by one of the q-PBOE components produced for demonstration purposes (with q=1 and therefore m=$\pm 2$), for left-circular and right-circular polarization of the input light. The images clearly show that the output beam is actually helical with $|m|=2$ and with helicity of sign m which is inverted by the inversion of the input polarization handedness (the left-hand FIG. (a) were obtained with left-circular polarized input light, and the right-hand FIG. (b) were obtained with right-circular polarized input light). Since the polarization of the input light can easily be switched automatically at a high rate (by means of an electro-optical cell followed by a normal quarter-wavelength birefringent plate), then clearly the same automatic switching can be extended to the helicity of the wavefront generated by the system described.

Figure 6:
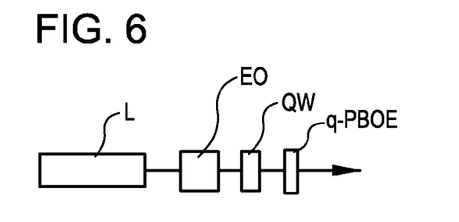
FIG. 6 is a simplified block diagram of an optical system for generating light beams with a helical wavefront with fast control of the sign of the helicity;.

FIG. 6 shows an optical system for the generation and fast switching of helical modes of an optical wave, based on the geometrical phase optical components described above, particularly a system for automatically controlling the helicity of the output light, assuming a non-helical and linearly polarized input (such as that from a normal laser).

L indicates a source of a light beam, for example a laser source of a linear polarization beam. Downstream of the laser source L there is an electro-optical cell EO (such as a Pockels cell) for switching between two orthogonal linear polarizations, which is coupled to a quarter-wave plate QW. Downstream of the plate QW there is a q-PBOE components of the type described above, for generating helical modes from an input light beam with circular polarization, having a geometry given by the relation $\alpha(x, y)=\alpha(r, \Phi)=q\Phi+\alpha_0$ described above.

The electro-optical switching of the circular polarization incident on the q-PBOE component, for example by means of a Pockels cell EO combined with the quarter-wave plate QW, is potentially very fast.

The q-PBOE included in the optical system of FIG. 6 therefore makes it possible to generate helical modes and to switch very rapidly between the two opposite helicities of the wavefront.

In the preceding analysis, it was assumed that the input wave in the q-PBOE was non-helical (in other words, of the order m=0), but an entirely similar analysis can be applied to the case in which the input wave is a helical wave, having an order of helicity m other than zero.

In this case, the passage of the wave through the q-PBOE causes a variation of the helicity of $\pm 2q$ according to the initial circular polarization state; in other words, the resulting output wave has an order of helicity $m'=m\pm 2q$ (provided the axis of the helical beam is aligned with the centre of the q-PBOE which is passed through).

This makes it possible to construct an optical system having a plurality of stages in series for automatically controlling the helicity of the generated light, in a set of values of m not limited to two items.

Figure 7:
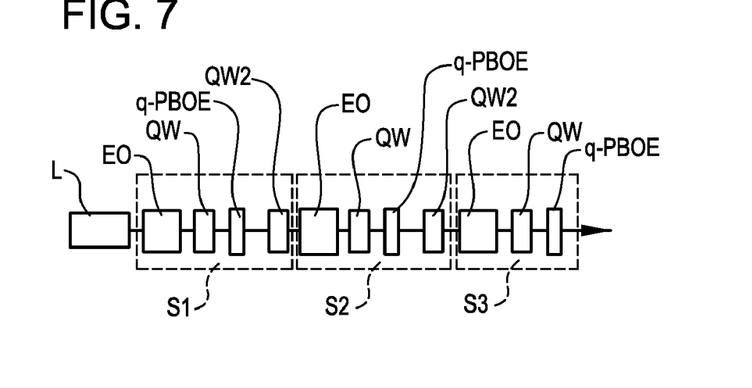
FIG. 7 is a simplified block diagram of a three-stage optical system based on the system of FIG. 6, for generating light beams with a helical wavefront with fast control of the sign of the helicity in a set of four values.
Figure 8A:
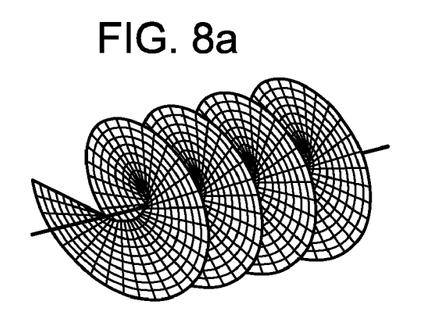
FIG. 8 is an exemplary representation of helical mode wavefronts for different values of helicity.
Figure 8B:
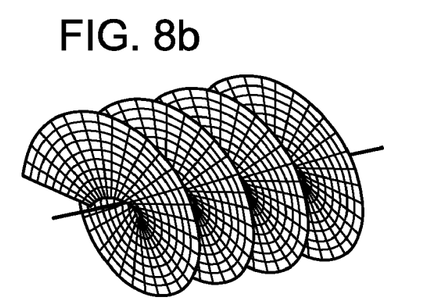
Figure 8C:
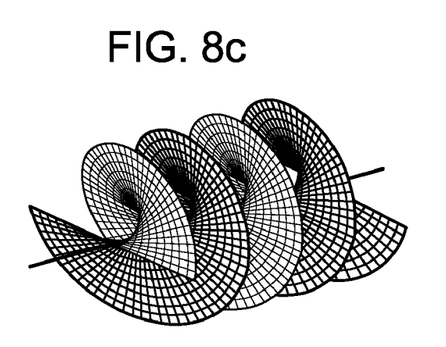
Figure 8D:
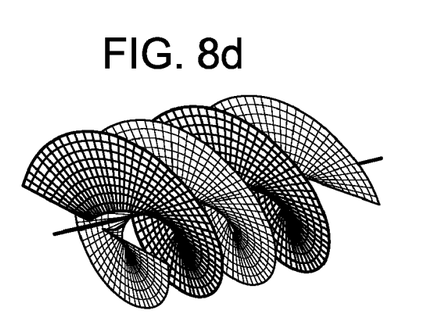

An example of a three-stage optical system for generating helical modes with an order m which can be switched in the set of four values $\{+3, +1, -1, -3\}$ is shown in FIG. 7.

Downstream of a laser beam source L there is a sequence of three cascaded stages, S1, S2, S3, each comprising an electro-optical cell EO (such as a Pockels cell) coupled to a quarter-wave plate QW and, downstream of the plate QW, a q-PBOE component with geometry defined by the relation $\alpha(x, y)=\alpha(r, \phi)=q\phi+\alpha_0$ described above, with $q=\frac{1}{2}$. A second quarter-wave plate QW2 is provided in cascade with the q-PBOE component, except in the final stage. The final polarization of the beam in the illustrated system cannot be controlled, but becomes controllable when the second quarter-wave plate QW2 is added to the third stage and an additional electro-optical cell is provided at the end of the line.

More generally, an optical system having n stages in series, similar to that described, will be capable of generating helical modes of light with automatic switching of the helicity between n+1 different values from $-2nq$ to $+2nq$ in steps of $4q$.

FIG. 8 shows, for guidance, examples of the spatial evolution of wavefronts of helical modes with helicities of m=+1 (a), m=-1 (b), m=+2 (c) and m=-2 (d).

A system of this kind can be applied to the encoding of information for optical communications, based on helical modes, and is naturally independent of the technology for producing the q-PBOE, which can be produced using a grating with a pitch smaller than the input wavelength, as is known in the art, or a liquid crystal technology such as that described above.

Naturally, the principle of the invention remaining the same, the forms of embodiment and details of construction may be varied widely with respect to those described and illustrated, which have been given purely by way of non-limiting example, without thereby departing from the scope of protection of the present invention as defined by the attached claims.

What is claimed is:

1. A geometrical phase optical element, which comprises a birefringent means with a spatially inhomogeneous optical axis in a plane orthogonal to the direction of propagation of an input beam of radiation, and which is adapted to modulate the phase of the wavefront of the said radiation according to a predetermined relation, characterized in that the said birefringent means includes a liquid crystal material, the orientation of the molecular director of the molecules of the material being controlled spatially in the plane orthogonal to the direction of propagation of the beam according to a predetermined geometrical pattern.

2. An optical element according to claim 1, comprising a liquid crystal cell (30) delimited by at least one planar anchorage surface with its easy axis orientated according to a predetermined geometrical pattern.

3. An optical element according to claim 2, in which the said planar anchorage surface includes an alignment layer having the said geometrical pattern for controlling the spatial orientation of the molecular director of the molecules of liquid crystal material obtained by surface treatments.

4. An optical element according to claim 2, in which the said cell comprises a second planar anchorage surface with its easy axis orientated according to a predetermined geometrical pattern which is a mirror image of the pattern of the first surface.

5. An optical element according to claim 2, in which the said cell comprises a degenerate second planar anchorage surface which is adapted not to impose any preferred orientation on the molecular director of the molecules of the liquid crystal material.

6. An optical element according to claim 1, comprising a liquid crystal cell including means of aligning the molecular director of the molecules of the liquid crystal material according to a predetermined geometrical pattern by the application of electromagnetic fields.

7. An optical element according to claim 1, comprising a film of liquid crystal polymers with an inhomogeneous molecular alignment according to a predetermined geometrical pattern.

8. An optical element according to claim 1, in which the said birefringent means is adapted to create a homogeneous phase delay equal to $\pi$ between the extraordinary and ordinary components of the input radiation in the direction of propagation.

9. An optical element according to claim 8, in which the said birefringent means forms a half-wave plane plate, positioned perpendicularly to the direction of propagation of the input radiation.

10. An optical element according to claim 1, in which the said predetermined geometrical pattern is defined by the relation $$\alpha(x, y) = ax + b$$

where $\alpha$ is the angle formed between the optical axis of the birefringent means and a reference axis of a predetermined Cartesian reference system in a plane orthogonal to the direction of propagation of the beam, in which a and b are constants.

11. An optical element according to claim 1, in which the said predetermined geometrical pattern is defined by the relation $$\alpha(x, y) = \alpha(r, \Phi) + ar^2$$

where $\alpha$ is the angle formed between the optical axis of the birefringent means and a reference axis of a predetermined Cartesian reference system in a plane orthogonal to the direction of propagation of the beam, in which r is the vector radius of the corresponding polar reference system, centred on the axis of propagation of the wavefront.

12. An optical element according to claim 1, in which the said predetermined geometrical pattern is defined by the relation $$\alpha(x, y) = \alpha(r, \Phi) = q\Phi + \alpha_0$$

where $\alpha$ is the angle formed between the optical axis of the birefringent means and a reference axis of a predetermined Cartesian reference system in a plane orthogonal to the direction of propagation of the beam, in which r, $\Phi$ are coordinates of the corresponding polar reference system, centred on the axis of propagation of the wavefront, q and $\alpha_0$ being constants.

13. An optical element according to claim 12, in which the value of q is an integer or semi-integer, and $\alpha_0$ has a value in the range from 0 to $2\pi$.

14. An optical system for generating helical modes of propagation of an input beam of optical radiation having a predetermined circular polarization state, including:

a geometrical phase optical element (q-PBOE) orientated transversely to the direction of propagation of the beam, comprising a birefringent means with a spatially inhomogeneous optical axis in a plane orthogonal to the direction of propagation of the input radiation beam, for modulating the phase of the wavefront of the said radiation, the optical axis being orientated according to the geometrical relation $$\alpha(x, y) = \alpha(r, \Phi) = q\Phi + \alpha_0$$

where $\alpha$ is the angle formed between the optical axis of the birefringent means and a reference axis of a predetermined Cartesian reference system in a plane orthogonal to the direction of propagation of the beam, in which r, $\Phi$ are coordinates of the corresponding polar reference system, centred on the axis of propagation of the wavefront, q and $\alpha_0$ being constants, the said element (q-PBOE) being adapted to transform a circular polarized input radiation beam into a helical mode with a wavefront having a helical surface, the handedness of which is a function of the handedness of the input polarization, and electro-optical modulation means (EO, QW) for switching the circular polarization of the input radiation between a pair of polarization states of opposite handedness, the system being arranged to switch between different orders of helicity of the radiation beam emerging from the said geometrical phase optical element (q-PBOE) by switching the circular polarization state of the input radiation.

15. An optical system according to claim 14, in which the said birefringent means includes a liquid crystal material, the orientation of the molecular director of the molecules of the material being controlled spatially in the plane orthogonal to the direction of propagation of the beam according to the said geometrical relation.

16. A system according to claim 14, in which the said electro-optical modulation means (EO) comprise a Pockels cell and a quarter-wave plate (QW) downstream of the said cell.

17. A system according to claim 14, comprising a plurality of cascaded stages, each of which includes the said geometrical phase optical element (q-PBOE) and the said electro-optical modulation means (EO, QW).

* * * * *